Oct. 9, 1945.  K. C. CLARK  2,386,195
VEHICLE COUPLER
Filed Feb. 12, 1944  2 Sheets-Sheet 1
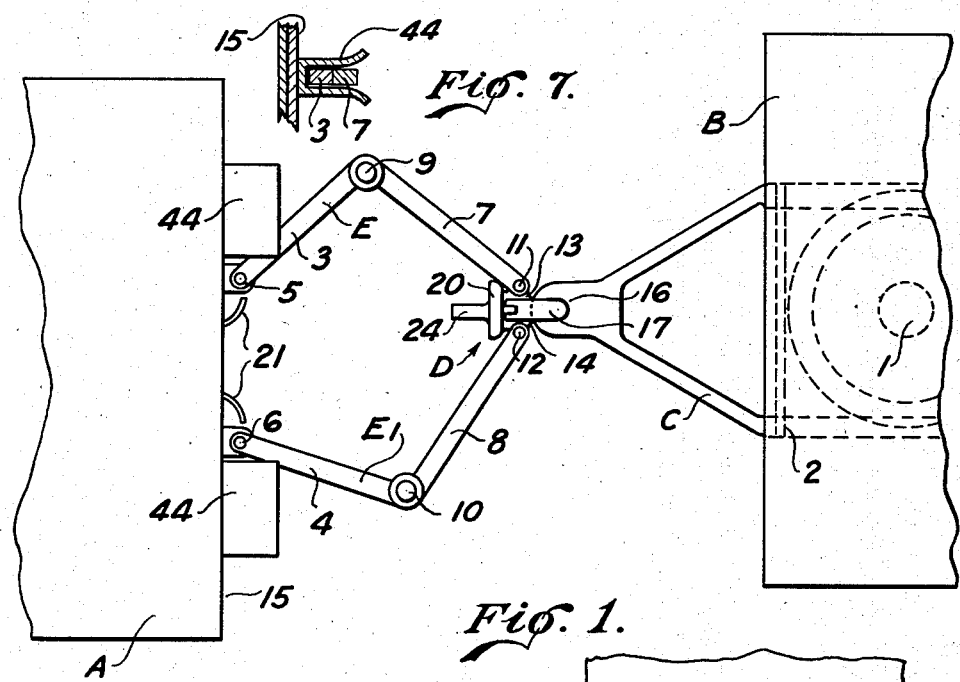
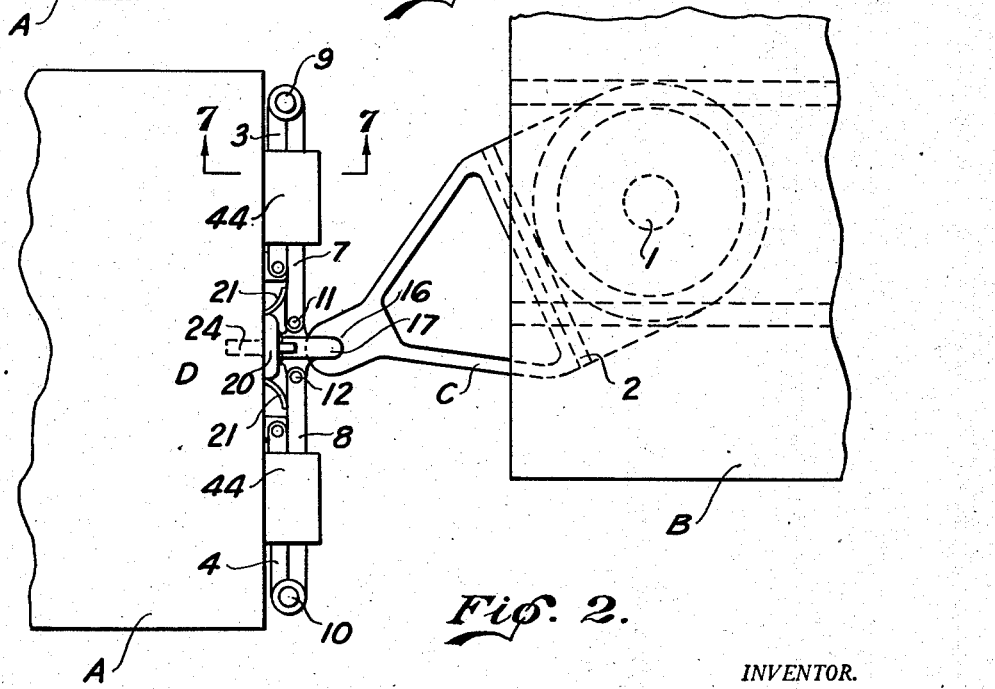
INVENTOR.
Kenneth C. Clark
BY
ATTORNEYS.

INVENTOR.
Kenneth C. Clark

Patented Oct. 9, 1945

2,386,195

UNITED STATES PATENT OFFICE 2,386,195

VEHICLE COUPLER

Kenneth C. Clark, Watsonville, Calif.

Application February 12, 1944, Serial No. 522,168

14 Claims. (Cl. 280—33.14)

The present invention relates to improvements in a vehicle coupler, and it consists of the combinations, constructions, and arrangements hereinafter described and claimed.

An object of my invention is to provide an improvement over the Vehicle coupler shown in my co-pending application, Serial No. 428,169, filed January 26, 1942, now Patent 2,341,528. In the co-pending case I show a vehicle coupler in which the pintle is carried by the truck and the tongue of the trailer is connected to jointed arms prior to moving the truck close enough to the trailer to cause the eye of the tongue to register with the pintle. The backing of the truck toward the trailer after the arms have been extended and connected to the tongue causes them to swing the tongue automatically for aligning the tongue eye with the pintle whereupon connection to the pintle can be made.

In the present form of the invention, the pintle is carried by the jointed arms which in turn are secured to the truck. The pintle is connected to the tongue eye after the tongue has been brought within the sweep of the arms, by extending the arms from the rear of the truck until the pintle registers with the eye. After connection is made between the pintle and tongue, the truck can be backed toward the trailer and the pintle will be automatically moved into the proper position with respect to the truck body and then be automatically connected thereto. Manually actuated means is used for disconnecting the pintle from the truck body and this means may be locked for holding the pintle securing means in retracted position.

A further object of my invention is to provide a device of the type described which is simple in construction and durable and efficient for the purpose intended. The device permits the driver after connecting the pintle to the tongue eye, to back the truck toward the trailer without regard to moving the truck into any particular position with the trailer and the device will first move the pintle into the proper position on the truck and then will automatically secure the pintle to the truck without the necessity of the driver moving backward and forward several times for aligning the pintle with the tongue eye, which is now the usual practice.

Other objects and advantages will appear in the following specification, and the novel features of the device will be particularly pointed out in the appended claims.

My invention is illustrated in the accompanying drawings forming a part of this application, in which Figure 1 is a plan view of the device showing the pintle connected to the tongue eye when the truck is still separated a considerable distance from the trailer;

Figure 2 is a view similar to Figure 1 but shows the pintle secured to the truck;

Figure 7 is a section taken along the line 7—7 of Figure 2.

While I have shown only the preferred form of my invention, it should be understood that various changes or modifications may be made within the scope of the appended claims without departing from the spirit and scope of the invention.

In carrying out my invention I make use of a truck or other prime mover indicated generally at A and I also show a trailer indicated generally at B. The trailer has a tongue C that is swingable about a fifth wheel 1. The tongue can also pivot about a horizontal hinge 2.

Figure 4:
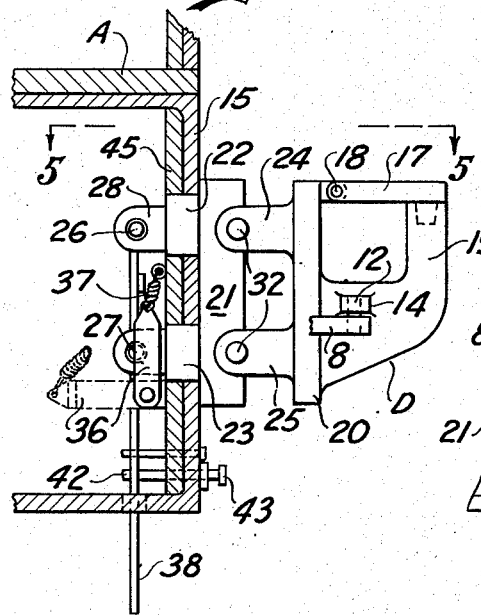
Figure 4 is a vertical section taken substantially along the line 4—4 of Figure 3.
Figure 3:
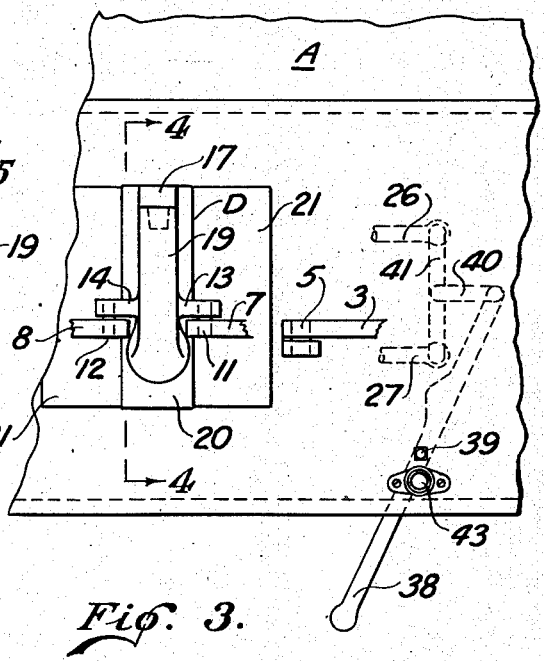
Figure 3 is a rear elevation of the truck and pintle showing only a portion of the device.

A pintle indicated generally at D is removably secured to the truck in a manner hereinafter described and is carried by jointed arms E and E'. The arms E and E' have links 3 and 4 hinged at 5 and 6 respectively to the rear of the truck A. Links 7 and 8 are hinged at 9 and 10 to the links 3 and 4 respectively and have their outer ends pivoted at 11 and 12 to ears 13 and 14 which are integral with the pintle. The arms E and E' permit the pintle to be removed from the rear end 15 of the truck into an extended position where the pintle hook 19 may be passed through an eye 16 formed in the tongue. Figure 4 shows the pintle D as having a keeper 17 that is hinged at 18 and is designed to close the top of the pintle hook 19.

The links of the arms E and E' when moved into closed position, as shown in Figure 2, will direct the base 20 of the pintle toward the rear center of the truck end 15. Arcuate-shaped guides 21 carried by the truck end 15 will guide the base 20 into proper position, as shown in Figure 2, when the truck A is moved toward the trailer B.

Figure 5:
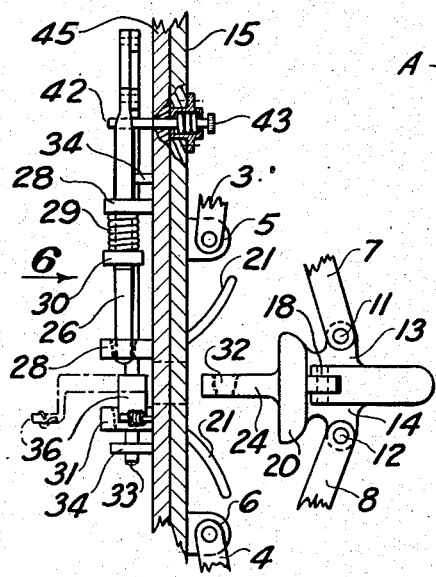
Figure 5 is a horizontal section taken substantially along the line 5—5 of Figure 4.
Figure 6:
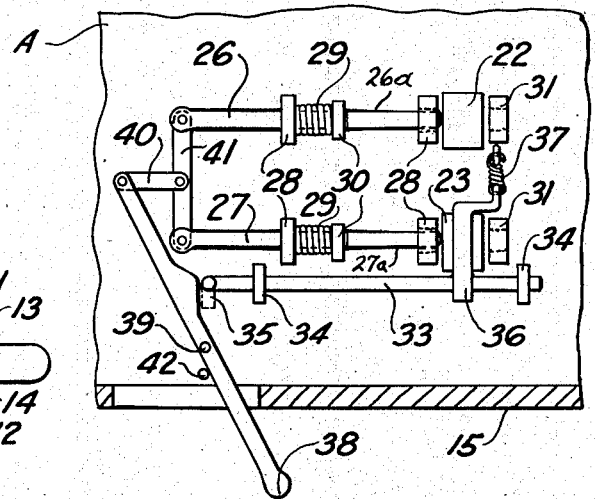
Figure 6 is a rear view of the pintle securing mechanism.

The means for automatically securing the pintle to the truck is shown in Figures 3 to 6 inclusive. Figure 4 shows the pintle ready to be moved against the rear channel 15 of the truck and the channel has openings 22 and 23 for receiving pintle lugs 24 and 25. Figures 5 and 6 show spring-pressed bolts 26 and 27 carried by stationary lugs 28 mounted on the channel 15 and coil springs 29 enclosing portions of the bolts, bear against certain of the lugs 28 and against collars 30 mounted on the bolts, for moving the bolts so that their free ends will enter openings in the lugs 31 disposed on the opposite sides of the lug-receiving openings 22 and 23, see Figure 6. The pintle lugs 24 and 25 have openings 32 for receiving the bolts 26 and 27 when the latter are moved into extended position.

Normally the bolts 26 and 27 are held in retracted position and this is accomplished by a mechanism that will automatically free the bolts after the pintle base 20 has been moved against the rear face of the channel 15. In Figure 6 I show a rocker rod 33 placed below and paralleling the bolt 27. The rod is rockably carried by bearings 34 and has an end bent at right angles for forming a stop 35. A rod-rocking arm 36 is carried by the rod 33 and a coil spring 37 tends to hold the arm in a vertical position as shown in Figures 4 and 6. A portion of the arm extends across the rear of the opening 23 and when the pintle is moved against the channel 15, the lower lug 25 will pass through the opening 23 and will contact the arm 36 for swinging it into a horizontal position, as shown by the broken lines in Figure 4. The swinging of the arm 36 through an arc of 90° will rotate the rod 33 through one-quarter of a circle and will move the stop 35 to free a hand lever 38. The hand lever is pivoted at 39 to the channel 15 and is connected to the bolts 26 and 27 by a link 40 and a lever 41.

It should be understood that the operator in releasing the pintle from the channel has swung the hand lever 38 into the position shown. The hand lever is held in this position by a spring-pressed bolt 42 that has been freed to project in back of the hand lever, as indicated in Figure 6. The bolt 42 has a head 43 which is turned through an arc of 90° for freeing the bolt and the turning movement permits the bolt spring to move the bolt into engagement with the hand lever. This will hold the bolts 26 and 27 free from the pintle lugs and the pintle may be moved away from the channel 15, and will be supported by the arms E and E' in the manner already stated. The freeing of the pintle from the channel 15 will permit the arm 36 to swing into a vertical position by the action of the spring 37 and this will rock the rod 33 for swinging the stop 35 into a position to engage with a shoulder on the hand lever 38 and prevent its return.

When the pintle is again connected to the channel the hand bolt 42 is retracted and secured in retracted position and the hand lever 38 will be held against return movement by the stop 35 contacting therewith. If now the pintle is moved for causing the lugs 24 and 25 to enter the openings 22 and 23, the lower lug 25 will swing the arm 36 for actuating the rod 33 and for moving the stop 35 out of contact with the hand lever 38 as above stated. The springs 29 will move the bolts 26 and 27 forwardly for causing them to enter the openings 32 of the lugs 24 and 25. In this way the pintle is automatically secured to the channel.

From the foregoing description of the various parts of the device, the operation thereof may be readily understood.

Figures 1 and 2 illustrate how the truck A and trailer B are connected together when the tongue C is within range of the extended arms E and E'. The pintle D is freed from the channel 15 and is extended by means of the arms E and E' to a point where the hook 19 can enter the eye 16 of the tongue C. The keeper 17 is moved down upon the top of the hook and then the truck and trailer are moved relatively toward each other. This movement will cause the arms E and E' to fold so that the link 7 will parallel the link 3 and the link 8 will parallel the link 4. The links enter channel-shaped guides 44 of the shape shown in Figures 1 and 7. As the links are folded into closed position, they will guide the pintle base 20 toward the arcuate guides 21. During this movement the tongue C will be swung with respect to the trailer should the trailer B be out of alignment with the truck A. Before the truck and trailer are moved toward each other, the bolt 42 will be secured in retracted position and therefore the entering of the pintle lugs 24 and 25 through the channel openings will cause the lower lug 25 to release the hand lever 38 automatically and the bolts 26 and 27 will pass through the lug openings in the manner already described. The bolts now connect the pintle to the channel 15. The channels are reinforced by a member 45, see Figure 4, if desired and this member will have openings registering with the openings 22 and 23. The arms E and E' do not carry any of the weight of the pintle or any pulling force after once the pintle has been secured to the channel.

When freeing the trailer from the truck, it is merely necessary to raise the keeper 17 and disconnect the tongue C from the hook 19. The pintle D will remain connected to the channel 15 ready for a subsequent connection to the tongue of the same trailer or to a different trailer. The bolts 26 and 27 have tapered portions 26a and 27a for entering tapered openings in the lugs 28 and 31 and in the pintle lugs 24 and 25. The tapering of the bolts and the openings is such that there will be a snug fit between the various parts to stop any rattling and wear. Moreover the tapered portions of the bolts will automatically take up any wear between the parts as it occurs.

I claim:

1. The combination with a pulling vehicle and a second vehicle having a pivoted tongue with an eye, of elbow-like arms pivotally carried by the first vehicle, a pintle pivotally carried by the free ends of the arms and receivable in the tongue eye when the tongue is in a position to be within the range of the swing of the arms, said arms swinging the pintle and eye toward the rear center of the first vehicle when the two vehicles are moved relatively toward each other, and means for securing the pintle to the first vehicle after the pintle has been brought into connectible relation with the first vehicle.

2. The combination with a pulling vehicle and a second vehicle having a pivoted tongue with an eye, of elbow-like arms pivotally carried by the first vehicle, a pintle pivotally carried by the free ends of the arms and receivable in the tongue eye when the tongue is in a position to be within the range of the swing of the arms, said arms swinging the pintle and eye toward the rear center of the first vehicle when the two vehicles are moved relatively toward each other, and automatic means for securing the pintle to the first vehicle after the pintle has been brought into connectible relation with the first vehicle, said means including a spring-actuated pintle-holding member, a trip for holding the member retracted, said trip being actuated by the pintle for releasing the holding member when the pintle is brought into connectible relation with the holding member.

3. The combination with two vehicles having cooperating coupling means for connecting the two vehicles together, said coupling means including a tongue pivotally connected to one of the vehicles and a pintle, of pintle supporting means carried by the other vehicle for moving the pintle into operative engagement with the tongue when the two vehicles are within a certain distance of each other, said pintle supporting means guiding the pintle to a predetermined place at the rear of the vehicle as the two vehicles are moved toward each other for coupling purposes, and means for securing the pintle to the first vehicle.

4. The combination with two vehicles having cooperating coupling means for connecting the two vehicles together, said coupling means including a tongue pivotally connected to one of the vehicles and a pintle, of pintle supporting means carried by the other vehicle for moving the pintle into operative engagement with the tongue when the two vehicles are within a certain distance of each other, said pintle supporting means guiding the pintle to a predetermined place at the rear of the vehicle as the two vehicles are moved toward each other for coupling purposes, and automatic means for securing the pintle to the first vehicle, said means including a spring-actuated pintle-holding member, a trip for holding the member retracted, said trip being actuated by the pintle for releasing the holding member when the pintle is brought into connectible relation with the holding member.

5. The combination with a pulling vehicle and a second vehicle having a fifth wheel with a tongue connected thereto, said tongue having an eye, of tongue-swinging means carried by the first vehicle, a pintle carried by the tongue-swinging means and connectable to the tongue eye when the vehicles are a certain distance apart, said means swinging the tongue and pintle when the two vehicles are moved toward each other for moving the pintle against the rear center of the first vehicle, and means for securing the pintle to the first vehicle.

6. The combination with a first vehicle, a second vehicle having a swingable tongue with an eye, of a pair of elbow-like arms pivoted to the first vehicle, a pintle connected to the free ends of the arms and being receivable in the tongue eye when the vehicles are within a certain distance of each other, the lengths of the arms being such as to guide the pintle against the rear center of the first vehicle as the two vehicles are moved toward each other for coupling purposes, and means for securing the pintle to the first vehicle.

7. The combination with a first vehicle, a second vehicle having a swingable tongue with an eye, of a pair of elbow-like arms pivoted to the first vehicle, a pintle connected to the free ends of the arms and being receivable in the tongue eye when the vehicles are within a certain distance of each other, the lengths of the arms being such as to guide the pintle against the rear center of the first vehicle as the two vehicles are moved toward each other for coupling purposes, and means for securing the pintle to the first vehicle, and guides for directing the pintle into the proper position on the first vehicle.

8. The combination with a vehicle, a second vehicle having a pivoted tongue with an eye, a pintle; of means carried by the first vehicle and movable supporting the pintle for permitting the pintle to be connected to the tongue for swinging the tongue and moving the pintle when the two vehicles are moved toward each other for causing the pintle to contact with the rear of the first vehicle; said means comprising a pair of jointed arms pivoted to the first vehicle near the rear center; each jointed arm consisting of a link extending from the pivot and having a length slightly less than the distance from the pivot to the adjacent vehicle side, and a second link pivoted to the free end of the first link and in turn being pivotally connected to the pintle; said pintle when connected to the tongue and the two vehicles are moved toward each other causing the links to fold, the arms bringing the pintle into the desired position with respect to the first vehicle, and means for securing the pintle to the first vehicle.

9. The combination with a vehicle, a second vehicle having a pivoted tongue with an eye, a pintle; of means carried by the first vehicle and movably supporting the pintle for permitting the pintle to be connected to the tongue for swinging the tongue and moving the pintle when the two vehicles are moved toward each other for causing the pintle to contact with the rear of the first vehicle; said means comprising a pair of jointed arms pivoted to the first vehicle near the rear center; each jointed arm consisting of a link extending from the pivot and having a length slightly less than the distance from the pivot to the adjacent vehicle side, and a second link pivoted to the free end of the first link and in turn being pivotally connected to the pintle; said pintle when connected to the tongue and the two vehicles are moved toward each other causing the links to fold, the arms bringing the pintle into the desired position with respect to the first vehicle, and means for securing the pintle to the first vehicle, said first vehicle having lug receiving openings, lugs carried by the pintle and being guided into the openings by the arms as the vehicles are moved toward each other, said pintle securing means including lug engaging members for securing the lugs to the vehicle.

10. The combination with a vehicle, a second vehicle having a pivoted tongue with an eye, a pintle; of means carried by the first vehicle and movably supporting the pintle for permitting the pintle to be connected to the tongue for swinging the tongue and moving the pintle when the two vehicles are moved toward each other for causing the pintle to contact with the rear of the first vehicle; said means comprising a pair of jointed arms pivoted to the first vehicle near the rear center; each jointed arm consisting of a link extending from the pivot and having a length slightly less than the distance from the pivot to the adjacent vehicle side, and a second link pivoted to the free end of the first link and in turn being pivotally connected to the pintle; said pintle when connected to the tongue and the two vehicles are moved toward each other causing the links to fold, the arms bringing the pintle into the desired position with respect to the first vehicle, and means for securing the pintle to the first vehicle, said first vehicle having lug receiving openings, lugs carried by the pintle and being guided into the openings by the arms as the vehicles are moved toward each other, said pintle securing means including lug engaging members for securing the lugs to the vehicle, said first vehicle having link supporting members and pintle guiding members, said link supporting members causing the links to raise or lower the pintle if need be while said guiding members align the lugs laterally with the openings for causing the lugs to enter the openings as the two vehicles move toward each other.

11. In a device of the type described, a vehicle frame having a pair of openings therein, a pair of jointed arms pivoted to the frame near the openings, a pintle carried by the free ends of the arms and having lugs adapted to enter the openings when the arms are folded, said lugs having openings therein, and bolts adapted to enter the lug openings for securing the pintle directly to the frame when the lugs are received in the frame openings.

12. In a device of the type described, a vehicle frame having a pair of openings therein, a pair of jointed arms pivoted to the frame near the openings, a pintle carried by the free ends of the arms and having lugs adapted to enter the openings when the arms are folded, said lugs having openings therein, and bolts adapted to enter the lug openings for securing the pintle directly to the frame when the lugs are received in the frame openings, manual means for retracting the bolts, locking means for holding the manual means and bolts in retracted position, said locking means being actuated by one of the lugs after entering the lug opening for swinging the locking means for automatically freeing the manual means, and springs for urging the bolts into the lug openings when the bolts are freed.

13. In a device of the type described, a vehicle frame having a pair of openings therein, a pair of jointed arms pivoted to the frame near the openings, a pintle carried by the free ends of the arms and having lugs adapted to enter the openings when the arms are folded, said lugs having openings therein, and bolts adapted to enter the lug openings for securing the pintle directly to the frame when the lugs are received in the frame openings, manual means for retracting the bolts, locking means for holding the manual means and bolts in retracted position, said locking means being actuated by one of the lugs after entering the lug opening for swinging the locking means for automatically freeing the manual means, and springs for urging the bolts into the lug openings when the bolts are freed, and auxiliary means for holding the manual means in retracted position independently of the locking means.

14. The combination with a vehicle frame having a pair of openings therein, a pair of jointed arms pivoted to the frame near the openings, a pintle carried by the free ends of the arms and having lugs adapted to enter the openings when the arms are folded, said lugs having openings therein, and bolts adapted to enter the lug openings for securing the pintle directly to the frame when the lugs are received in the frame openings, a second vehicle having a pivoted tongue with an eye, said pintle being receivable in said tongue eye when the vehicles are within a certain distance of each other.

KENNETH C. CLARK.